United States Patent
Lynn et al.

(10) Patent No.: US 7,588,634 B2
(45) Date of Patent: Sep. 15, 2009

(54) PROCESS FOR MANUFACTURING ULTRA LOW CONSISTENCY ALPHA- AND BETA-BLEND STUCCO

(75) Inventors: Michael R. Lynn, Arlington Heights, IL (US); W. David Song, Gurnee, IL (US); Qingxia Liu, Vernon Hills, IL (US); Qiang Yu, Grayslake, IL (US); Michael L. Cloud, Canton, OK (US)

(73) Assignee: United States Gypsum Company, Chicago, IL (US)

( * ) Notice: Subject to any disclaimer, the term of this patent is extended or adjusted under 35 U.S.C. 154(b) by 118 days.

(21) Appl. No.: 11/533,604

(22) Filed: Sep. 20, 2006

(65) Prior Publication Data

US 2008/0069762 A1  Mar. 20, 2008

(51) Int. Cl.
  *C04B 11/00* (2006.01)
(52) U.S. Cl. .................... 106/772; 423/555
(58) Field of Classification Search .............. 423/555; 106/772
  See application file for complete search history.

(56) References Cited

U.S. PATENT DOCUMENTS

| | | | |
|---|---|---|---|
| 1,548,358 A | 8/1925 | Edwards | |
| 1,713,879 A | 5/1929 | McAnally | |
| 2,907,667 A | 10/1959 | Johnson | |
| 3,236,509 A | 2/1966 | Blair | |
| 3,410,622 A | 11/1968 | Ruter et al. | |
| 3,410,655 A | * 11/1968 | Cherdron et al | ............. 423/170 |
| 3,415,910 A | 12/1968 | Kinkade et al. | |
| 4,117,070 A | 9/1978 | O'Neill | |
| 4,153,373 A | 5/1979 | O'Neill | |
| 4,201,595 A | 5/1980 | O'Neill | |
| 4,234,345 A | * 11/1980 | Fassle | ........................ 106/784 |
| 4,435,183 A | 3/1984 | Baehr | |
| 4,533,528 A | 8/1985 | Zaskalicky | |
| 5,723,226 A | 3/1998 | Francis et al. | |
| 5,743,728 A | 4/1998 | Cloud et al. | |
| 5,927,968 A | 7/1999 | Rowland et al. | |
| 5,954,497 A | 9/1999 | Cloud et al. | |
| 6,138,377 A | 10/2000 | Bolind et al. | |
| 6,355,099 B1 | 3/2002 | Immordino et al. | |
| 6,652,825 B2 | 11/2003 | Sethuraman et al. | |
| 6,706,113 B1 | 3/2004 | Couturier | |
| 2005/0127208 A1 | 6/2005 | Kaligian, II et al. | |
| 2005/0161853 A1 | 7/2005 | Miller et al. | |
| 2005/0188898 A1 | 9/2005 | Bruce et al. | |

* cited by examiner

*Primary Examiner*—Paul Marcantoni
(74) *Attorney, Agent, or Firm*—Novak Druce + Quigg LLP

(57) ABSTRACT

A process is disclosed for making a blend of alpha- and beta-stucco including a slurry calcination step to produce alpha calcium sulfate hemihydrate followed by a fluidized bed calcination step to produce beta calcium sulfate hemihydrate. The process starts with 50-75% gypsum-containing solids slurry, and then steam calcines the slurry in a first reactor to form partially calcined gypsum slurry which contains calcium sulfate dihydrate and alpha calcium sulfate hemihydrate. The partially calcined slurry is then dewatered. Then the filter cake is fed into a kettle to complete the calcination process by converting the calcium sulfate dihydrate of the filter cake material into beta calcium sulfate hemihydrate.

18 Claims, 1 Drawing Sheet

PROCESS FOR MANUFACTURING ULTRA LOW CONSISTENCY ALPHA- AND BETA-BLEND STUCCO

FIELD OF THE INVENTION

This invention relates to an improved method of making calcined gypsum which results in an ultra-low consistency alpha- and beta-blend stucco. In particular, the present invention provides a process which comprises a slurry calcination step in a first reactor to produce alpha calcium sulfate hemihydrate followed by a calcination step, for example a fluidized bed calcination step, in a second reactor to produce beta calcium sulfate hemihydrate.

BACKGROUND OF THE INVENTION

Gypsum calcium sulfate dihydrate, $CaSO_4.2H_2O$ comes from a variety of sources. Land plaster is a term for natural gypsum which is any mixture containing more than 50% calcium sulfate dihydrate, $CaSO_4.2H_2O$ (by weight).

Generally, gypsum-containing products are prepared by forming a mixture of calcined gypsum phase (i.e., calcium sulfate hemihydrate and/or calcium sulfate soluble anhydrite) and water, and, optionally, other components, as desired. The mixture typically is cast into a pre-determined shape or onto the surface of a substrate. The calcined gypsum reacts with the water to form a matrix of crystalline hydrated gypsum, i.e., calcium sulfate dihydrate. It is the desired hydration of calcined gypsum that enables the formation of an interlocking matrix of set gypsum, thereby imparting strength to the gypsum structure in the gypsum-containing product.

Stucco is defined as chemically calcium sulfate hemihydrate and is a well-known building material used to make building plasters and gypsum wallboard. Stucco is typically made by crushing the gypsum rock with and then heating the gypsum at atmospheric pressure to calcine (dehydrate) the calcium sulfate dihydrate into calcium sulfate hemihydrate. In addition to natural gypsum rock the use of Flue Gas Desulphurization gypsum or gypsum from chemical processes can be used as well. Traditionally, the calcining of gypsum has occurred in a large atmospheric pressure kettle containing a mixture of the various phases of the gypsum U.S. Pat. No. 5,927,968 to Rowland et al., incorporated herein by reference in its entirety, discloses its own method and apparatus for continuous calcining of gypsum in a refractoryless atmospheric kettle. However, U.S. Pat. No. 5,927,968 to Rowland et al. also discloses a variety of kettles for calcining stucco. One such kettle has a thickened dome-shaped bottom, against which a gas-fired flame is directed, with the kettle and burner flame being enclosed in a suitable refractory structure. There is usually an associated hot pit into which the calcined material is fed. The kettle must withstand temperatures in the 2,000-2,400° F. (1093-1314° C.) range. U.S. Pat. No. 5,927,968 to Rowland et al. states U.S. Pat. No. 3,236,509 to Blair typifies this type construction.

U.S. Pat. No. 3,236,509 to Blair, incorporated herein by reference, discloses continuous fluidized kettle calcination in which dried mineral gypsum powder is fed to a covered, but air vented and lightly vacuum exhausted, calcination vessel. After a steady state of operation is attained in the vessel, a substantially continuous stream of cold gypsum that has been pre-dried and ground to a finely divided state and with a wide distribution of fragmented particle sizes, is added on top of the fluidized, boiling mass in the kettle. Under such conditions, the thermal shock upon the cold, dry mineral being dropped into the already boiling mass radically fractures the ground gypsum rock fragments, and the resultant stucco (beta hemihydrate) is highly fractured and fissured, as well as being widely distributed in particle size. This causes the stucco to disperse very rapidly in water, and requires high amounts of gauging water to be mixed with the stucco for rehydration to gypsum at customary use consistencies.

This "dispersed consistency", also known in the art as "consistency" or "water demand", is an important property of stucco. Stuccos of lower consistency generally result in stronger casts.

The normal consistency of stucco (gypsum plaster) is a term of art and is determinable according to ASTM Procedure C472, or its substantial equivalents. It is defined as the amount of water in grams per 100 grams of stucco.

U.S. Pat. No. 4,533,528 to Zaskalicky, incorporated herein by reference in its entirety, discloses directly feeding wet chemical gypsum cake to a continuous kettle calciner to produce beta hemihydrate of lower consistency. As explained in Zaskalicky, and also for purposes of the present description, "dispersed consistency" may be defined as the water volume required to give a standard viscosity or flow when a standard amount by weight of stucco is dispersed by mechanical mixing in a laboratory mixer at high shear intensity and for a standard time to equal mixing encountered in the gypsum board forming line, e.g., 7 seconds, or in an industrial plaster formulation casting mixer, e.g. 60 seconds.

For example, as explained in U.S. Pat. No. 4,201,595 to O'Neill, incorporated herein by reference in its entirety, calcined gypsum made by continuous calcination may have a dispersed consistency of about 100-150 cc. "Dispersed consistency" for purposes of gypsum board manufacture may be defined as the water volume required to give a standard viscosity or flow when 100 grams of stucco is dispersed by mechanical mixing in a laboratory high speed blender at high shear intensity and for 7 seconds which is equivalent to the mixing encountered in the board forming line. While the dispersed consistency may be expressed in a particular numerical figure, it will be appreciated that any particular number is variable from one process to the next depending on the particular stucco and the rate of production.

Low consistency stucco is particularly advantageous in automated gypsum board manufacture, in which a large portion of the processing time and processing energy is devoted to removing excess water from the wet board. Considerable excess water is required in gypsum board manufacture to properly fluidize the calcined gypsum and obtain proper flow of the gypsum slurry.

A dispersed consistency value of 100-150 cc. indicates a water requirement of about 85-100 parts of water per 100 parts of the calcined gypsum for a typical slurry in a gypsum wallboard plant. The theoretical water required to convert the calcined gypsum (calcium sulfate hemihydrate or stucco) to set gypsum dihydrate is only 18.7% by weight on a pure basis. This leaves about 67 to about 82% of the water present in the gypsum slurry to be removed in drying the board. Ordinarily, gypsum board dryers in a gypsum board manufacturing line will remove this water, for example, by maintaining the air temperature at about 400° F. (204° C.) and requiring a drying time of about 40 minutes.

U.S. Pat. No. 4,201,595 (also mentioned above), U.S. Pat. Nos. 4,117,070 and 4,153,373 to O'Neill, all incorporated herein by reference in their entirety, teach to lower the dispersed consistencies of continuously calcined kettle stuccos by an after calcination treatment of the stucco with small amounts of water or various aqueous solutions, resulting in a damp but dry appearing material and allowing the small amounts of free water to remain on the calcined gypsum particle surface for a short period of time, about 1-10 minutes for the treated stucco to "heal".

U.S. Pat. No. 3,410,655 to Ruter et al., incorporated herein by reference in its entirety, teaches producing alpha calcium sulfate hemihydrate. Ruter et al. states the alpha-hemihydrate forms non-needle like crystals, as opposed to the beta calcium sulfate hemihydrate which forms needle-like crystals. Ruter et al. also states the usual plaster of Paris (calcium sulfate hemihydrate) is the beta calcium sulfate hemihydrate. However, depending on the manner of preparation, the plaster of Paris still contains more or less anhydrous calcium sulfate, and/or alpha calcium sulfate hemihydrate. Moreover, plasters with definite alpha-hemihydrate content exhibit higher strengths. Ruter et al. teaches to make alpha calcium sulfate hemihydrate in the form of non-needle-like crystals by elutriating the dihydrate with water to remove organic impurities and fine and slimy crystal portions, forming an aqueous suspension of the dihydrate at a pH about 1.5-6, and subsequently heating under closely controlled conditions.

U.S. Pat. No. 2,907,667 to Johnson, incorporated herein by reference in its entirety, states alpha-hemihydrate is prepared by heating the dihydrate under controlled vapor pressure conditions in the presence of steam or in an aqueous solution.

U.S. Pat. No. 4,234,345 to Fässle discloses fast-setting alpha calcium sulfate hemihydrate made from calcium sulfate dihydrate by hydrothermally recrystallizing calcium sulfate dihydrate to form a mixture containing 95%-99% by weight alpha calcium sulfate hemihydrate and 5 to 1% calcium sulfate dihydrate. The dihydrate in this mixture is then converted to beta calcium sulfate hemihydrate by calcining, except for a remainder of up to 0.5 percent of dihydrate, which remains in the mixture.

There is a need for stuccos having low consistency and good strength characteristics.

SUMMARY OF THE INVENTION

It is an object of the invention to provide a process for making a stucco composition comprising alpha calcium sulfate hemihydrate and beta calcium sulfate hemihydrate.

The present process starts with 50-75% gypsum-containing solids by weight in aqueous slurry.

Direct injection of steam of a quality between 100 to 200 psig, into the slurry in or prior to the first continuous stirred tank reactor, at 60 psig, converts 50 to 95% wt. % of the gypsum solids to alpha calcium sulfate hemihydrate. This forms partially calcined gypsum slurry which contains calcium sulfate dihydrate and alpha calcium sulfate hemihydrate. In particular, about 80-90% wt. % or 70-85 wt. % of the gypsum is calcined to alpha calcium sulfate hemihydrate. The partially calcined gypsum slurry is then dewatered, for example in a filter press to produce a filter cake of dewatered solids of 95 to 98% solids. The filter cakes temperature is maintained above 170° F. (77° C.) during the separation. Then the dewatered hot solids are fed to an atmospheric kettle to complete the calcination process by converting the calcium sulfate dihydrate of the dewatered solids into beta calcium sulfate hemihydrate. The hot water (recovered without significant cooling) is returned to the feed of the process to minimize the energy used in the process. Alternately, the heat from the water can be used along with the waste heat from the kettle process to preheat the feed slurry of gypsum at the start of the process.

The present process for making a blend of alpha- and beta-stucco results in near theoretical water demand for use in a board manufacturing process. The theoretical amount of water to hydrate 100% pure CSH (calcium sulfate hemihydrate) to the gypsum form would be 21 parts of water to 100 parts of CSH. This process results in a water demand down to 21 parts with a minimum amount of dispersants or fluidizers required. Beta stucco alone has a water demand up to 140 parts of water and requires a large amount of dispersant to reach the flow characteristic of the alpha-beta blend stucco. Alternately a blend of alpha and beta hemihydrate can be made using powders. The resulting material requires more total energy if made by stand alone processes. Also, the resulting material requires a higher percentage of alpha to beta to achieve the same results. Therefore, the present invention provides a more economical calcining method to produce the alpha-beta stucco.

The alpha hemihydrate aids in fluidity while the beta-hemihydrate aids in reactivity. The process can also be energy efficient because it can recycle hot water recovered from dewatering. Also, the solids are kept hot during dewatering to ensure the material does not hydrate back to gypsum.

DETAILED DESCRIPTION OF THE PREFERRED EMBODIMENTS

Figure 1:
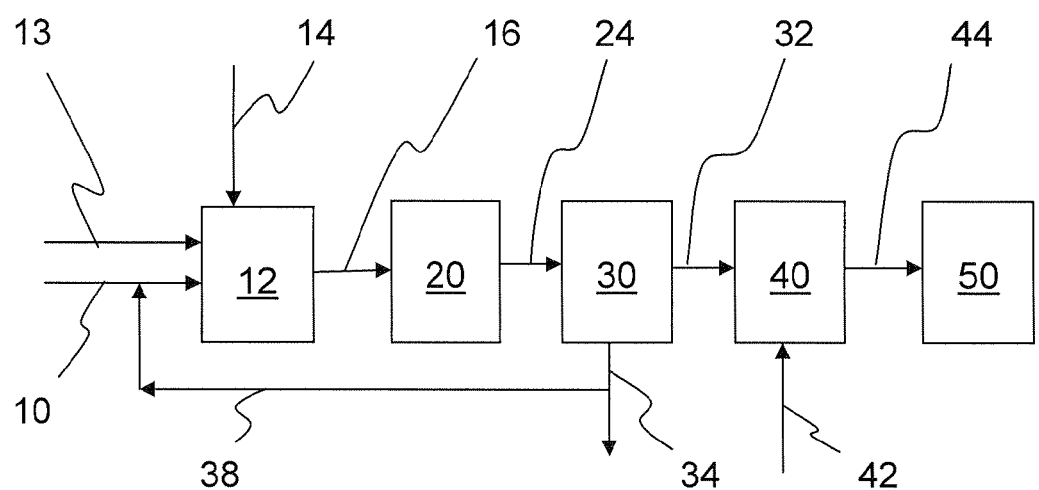
FIG. 1 is a process flow diagram of an embodiment of the process of the present invention.

FIG. 1 shows an embodiment of an apparatus for performing the process of the present invention. Gypsum (calcium sulfate dihydrate) and water are mixed in a mixer (not shown) to form a 50-75% solids gypsum slurry 10. Gypsum slurry 10 is fed to a jacketed reactor 12 (autoclave). Steam 13 is also fed to the reactor 12 to provide heat. Other forms of heat may also be provided to the reactor 12 as appropriate. The feed gypsum may be any form of gypsum, such as land plaster, gypsum mineral from ground or unground sources, synthetic gypsum from flue gas desulfurization processes in power plants, or other chemical gypsum as by-products of the titanium dioxide industry. Traditionally the feed gypsum is land plaster manufactured by grinding gypsum rock to a fine particle size in a roller mill. The fineness of the land plaster is 95 to 98% less than 100 ASTM mesh. Land plaster gypsum purity can range from 80 to 99 wt. % calcium sulfate dihydrate.

A crystal modifier 14 may also be fed to the reactor 12 if desired. The crystal modifier 14 controls the crystal morphology of the calcium sulfate alpha hemihydrate to achieve a desired particle size, e.g., 50 to 20 microns ($d_{50}$) average particle size. Prior to the dewatering of the alpha hemihydrate slurry additives may be added that will aid in the filtration, act as a hydration accelerator, and/or provide added fluidity to the final material.

The slurry 10 is held in the reactor 12 at conditions for calcining the gypsum to partially convert it to alpha calcium sulfate hemihydrate, for example 55 psig at 300° F. (149° C.). Typically, 50 to 95%, or 80 to 95%, or 80 to 90% of the gypsum is converted by calcination to alpha calcium sulfate hemihydrate, alpha-$CaSO_4 \cdot 0.5\ H_2O$ with a residence time of 5 minutes. The conversion can be controlled by changing the residence time or temperature of the reactor discharge. The higher the temperature the faster the conversion takes place. The longer the residence time the higher the conversion rate is achieved.

Typically, the reactor 12 is a continuous stirred tank reactor (CSTR) operating at a pressure of 15 to 100 psig (29.7 to 114.7 psia, 2.0 to 7.9 bar), preferably 25 to 75 psig (39.7 to 89.7 psia, 2.7 to 6.2 bar) or 35 to 55 psig (49.7 to 69.7 psia, 3.4 to 4.8 bar). The temperature of the reactor 12 corresponds to the temperature of saturated steam at the operating pressure. For example, a pressure of about 52 psig (66.7 psia, 4.6 bar) corresponds to a temperature of about 300° F. (149° C.). The residence time of the slurry in the reactor 12 generally ranges from 2 to 30 minutes, preferably 5 to 15 minutes.

For example, in a typical embodiment, after the reactor 12 is closed, hot steam 13 is delivered to the jacket around the reactor 12 to heat the reactor 12 for about 5 minutes. The change in temperature and pressure inside the reactor are monitored as a function of time. Then after about 10 minutes, the delivery pressure of the steam 13 was increased to bring the reaction to completion in about 5 additional minutes. The crystal modifiers 14 could, for example, be added to the slurry 10 before heating begins or while the slurry 10 is being heated or maintained at a desired temperature in the reactor 12.

The partially calcined gypsum product 16 discharges from the reactor 12 as a slurry comprising calcium sulfate dihydrate and alpha calcium sulfate hemihydrate and feeds an accumulator tank 20. Accumulator tank 20 acts as a holding tank and permits release of the steam as the slurry's pressure drops to atmospheric pressure. If desired the accumulator tank 20 may be omitted if the separation stage (dewatering unit 30) is direct coupled.

The slurry 24 discharges from the accumulator tank 20 and feeds a dewatering unit 30 which removes water to produce a dewatered solids-containing product 32 and a removed water stream 34.

All or a portion of the removed water 34 may be recycled as a stream 38 to be part of the slurry 10 to assist in recycling water, heat and chemicals (such as the crystal modifiers or other additives) used in the process. Typically the stream 38 is recycled at an elevated temperature, such as 100 to 200° F. (38 to 93° C.). The partially calcined gypsum product 16, the accumulator tank 20, the stream 24, the dewatering unit 30 and the dewatered product 32 are kept at a temperature sufficiently high to prevent the alpha hemihydrate from rehydrating, e.g., kept at elevated temperature of 160-212° F. (71-100° C.).

Typically the dewatering unit 30 is a filter press and/or centrifuge and the dewatered product 32 has a 2 to 6 wt. %, typically 4%, free water moisture content. A typical filter press employs steam to press down on a plate over the partially calcined gypsum product slurry to drive out the water. If desired the process of Baehr U.S. Pat. No. 4,435,183 may be employed for dewatering and drying calcium sulfate hemihydrate in a centrifuging and flash drying operation by ejecting the wet solids from the centrifuge bowl directly into the flash dryer's high velocity, high volume, heated air stream. Baehr U.S. Pat. No. 4,435,183 is incorporated herein by reference.

The dewatered product 32 is fed to a board stucco kettle calciner 40 at conditions to convert the majority or all of the gypsum in the dewatered product 32 to beta calcium sulfate hemihydrate. The kettle calciner 40 typically is indirectly heated at atmospheric pressure by use of natural gas heating on the bottom and direct fired heated air 42. The material behaves as a fluidization bed due to the free water vapor leaving the solids fed to the kettle reactor 40 as well as the bound water released as the gypsum (calcium sulfate dihydrate) converts to calcined beta gypsum (beta calcium sulfate hemihydrate). Fluidization gas may also be provided by the indirect fired gas heated air or use of direct fired heated air 42. The kettle 40 typically operates at atmospheric pressure, and a temperature of from 150 to 1000° F. (66 to 538° C.), preferably 250 to 650° F. (121 to 343° C.) or 400 to 500° F. (204 to 260° C.) or 285 to 300° F. (140 to 149° C.).

The kettle 40 discharges a dry product 44 comprising alpha calcium sulfate hemihydrate and beta calcium sulfate hemihydrate (also known as an alpha and beta stucco blend). Optionally, the dry product 44 is sent to grinding 50 to reduce the particle size of the material.

Typically the dry product 44 has less than 5 wt. %, preferably less than 2 wt. %, calcium sulfate anhydrite and less than 5 wt. %, preferably less than 2 wt. %, calcium sulfate dihydrate.

Typically the calcium sulfate of the final product is 50-95 wt. % alpha hemihydrates and 50 to 5 wt. % beta hemihydrate; for example, 70-85 wt. % alpha hemihydrates and 30-15 wt. % beta hemihydrate; or 80-90 wt. % alpha hemihydrates and 20-10 wt. % beta hemihydrates.

The crystal modifier 14, if employed, is in the solution during the period of calcination to alpha hemihydrate. The pH of the solution is in the neutral range between 6 and 8. The crystal modifiers 14 act in reducing the number of nuclei that form in the solution and also restrain the growth of the crystal in one of its axis. The result is control of the particle size through control of the number of crystals forming and growing. The other result is that the shape of the crystal is cubic like in aspect ratio. With no modifiers in the solution the shape of the alpha hemihydrate would be a long acicular needle shaped crystal of aspect ratio up to 100:1 in length to diameter.

The resulting alpha-beta-stucco blend typically has a number of desirable properties of consistency, compressive strength and density.

For example, the typical dry product has a normal consistency of about 30 to 36 as measured by a handmix drop consistency determination.

In contrast to normal consistency measured according to ASTM Procedure C472, normal consistency as measured by a handmix drop consistency method is not ASTM Procedure C472 test. The test method for measuring normal consistency by a handmix drop consistency method is as follows.

Weigh a 50 gram sample of the plaster to be tested at 70-80° F. (21-27° C.) to 0.1 gram accuracy. Drained the mixing cup and spatula before using such that the mixing cup and spatula contain a maximum of ¼ cc of adhering droplets of water or are wiped dry. Add water to the mixing cup from a burette (deionized or distilled at 70-80° F. (21-27° C.) unless otherwise specified) in the estimated quantity to produce the proper flow. Sift the plaster into the water and allow the sample to soak undisturbed for 60 seconds. Mix thoroughly for 30 seconds, stirring 90 to 100 complete revolutions with the spatula. Pour the slurry immediately after mixing on to a clean, dry, unscratched PLEXIGLASS sheet from a height of 1½ inch. At the correct consistency, the mix will flow out of the cup without the aid of the spatula.

The mix should form a round patty of reasonably uniform thickness. The patty diameters for each specific consistency range are as follows in TABLE 1 (when measured in at least two directions and averaged):

TABLE 1

| Normal Flow Formulations Consistency Range (cc) | Average Patty Diameter |
| --- | --- |
| 30-39 | 3⅛ ± 1/16 inch (7.9 ± 0.16 cm) |
| 40-49 | 3¼ ± 1/16 inch (8.25 ± 0.16 cm) |
| 50-59 | 3½ ± 1/16 inch (8.9 ± 0.16 cm) |
| 60-89 | 3¾ ± 1/16 inch (9.5 ± 0.16 cm) |
| 90-140 | 4 ± 1/16 inch (10.2 ± 0.16 cm) |

Crystal Modifiers

TABLE 2 presents typical crystal modifiers. Also, U.S. Pat. No. 2,907,667 to Johnson, incorporated herein by reference, discloses a number of chemicals which impact reactions in reactors for making alpha calcium sulfate hemihydrate.

TABLE 2

Typical Crystal Modifiers

| | |
|---|---|
| Maleic Acid | Tartaric Acid |
| Succinic acid | Polyacrylic acid |
| Lactic acid | Aspartic acid |
| Citric acid | Monosodium gluconate |
| Tartaric acid | Tri-polyphosphate |
| Monosodium gluconate | Gelatin |
| Ethylene diamine tetra-acetic acid or sodium salt thereof | DEQUEST 2006 (penta-sodium salt of amino trimethylene phosphonic acid) |
| Aspartic acid | Ethylene diamine tetra-acetic acid or sodium salt thereof |
| Citric acid | Diethylene triamine penta-acetic acid |

The stucco composition of the invention can be used in both the manufacture of gypsum wallboard and stucco for production of a plaster for interior and exterior applications. One or more additives can be added to the stucco composition to facilitate the desired viscosity, and other optional additives may be added to achieve desired physical characteristics in the final set product, such as, for example, flexural strength, abuse resistance (e.g., chip resistance), water resistance, flame resistance, and the like, or combinations thereof.

EXAMPLES

A plant control and three plant trial examples of the present invention were conducted. In the Control and Examples, 75% solids slurry was fed to one continuous stirred tank reactor (CSTR) of 275 gallons (1041 liters) in size used for the Alpha-portion of the calcinations. A high temperature Tube mill was used for the Beta-portion of the calcinations of the Examples. The Tube mill was a heated ball mill.

Control

At a reactor temperature of 298° F. (148° C.), 99% of the gypsum of the feed slurry was calcined to Alpha calcium sulfate hemihydrate, which had a normal consistency of 32 to 34 cc. Normal consistencies in the Control and the following Examples were measured by the above-described hand drop test.

Example 1

At a reactor temperature of 285° F. (141° C.), 90% of the gypsum fed to the first reactor was calcined to Alpha calcium sulfate hemihydrate. The resulting slurry was filtered and the filtered solids were further calcined in the Tube mill at 300° F. (149° C.). The filtered product before being fed to the Tube mill was kept at elevated temperature of 160-212° F. (71-100° C.). The Tube mill converted at least a portion of the calcium sulfate dihydrate of the dewatered solids into beta calcium sulfate hemihydrate. Thus, the resulting product had 90% alpha calcium sulfate hemihydrate and 8.5%-9% beta calcium sulfate hemihydrate for a total hemihydrate yield of 98.5% or higher relative to the amount of gypsum of the feed slurry. In other words, 90% of the gypsum of the feed slurry converted to alpha calcium sulfate hemihydrate and 8.5%-9% converted to beta calcium sulfate hemihydrate. The normal consistency of the resulting product was 32 cc.

Example 2

At a reactor temperature of 280° F. (138° C.), 85% of the gypsum fed to the first reactor was calcined to alpha calcium sulfate hemihydrate. The resulting slurry was filtered and the filtered solids were further calcined in the tube mill at 300° F. (149° C.). The filtered product before being fed to the Tube mill was kept at elevated temperature of 160-212° F. (71-100° C.). The Tube mill converted at least a portion of the calcium sulfate dihydrate of the dewatered solids into beta calcium sulfate hemihydrate. The resulting product had 85% alpha calcium sulfate hemihydrate and 13.5%-14% beta calcium sulfate hemihydrate for a total hemihydrate yield of 98.5% or higher relative to the amount of gypsum of the feed slurry. The normal consistency of the resulting product was 34 cc.

Example 3

At a reactor temperature of 275° F. (135° C.), 80% of the gypsum fed to the first reactor was calcined to alpha calcium sulfate hemihydrate. The resulting slurry was filtered and the filtered solids were further calcined in the tube mill at 300° F. (149° C.). The filtered product before being fed to the Tube mill was kept at elevated temperature of 160-212° F. (71-100° C.). The Tube mill converted at least a portion of the calcium sulfate dihydrate of the dewatered solids into beta calcium sulfate hemihydrate. The resulting product had 80% alpha calcium sulfate hemihydrate and 18.5%-19% beta calcium sulfate hemihydrate for a total hemihydrate yield of 98.5% or higher relative to the gypsum of the feed slurry. The normal consistency of the resulting product was 32 cc.

The data shows the present inventive process has the advantage that it results in a combined alpha calcium sulfate hemihydrate and beta calcium sulfate hemihydrate product that has a normal consistency similar to that of an alpha calcium sulfate hemihydrate product.

Although we have described the preferred embodiments for implementing our invention, it will be understood by those skilled in the art to which this disclosure is directed that modifications and additions may be made to the invention without departing from the spirit and scope thereof.

We claim:

1. A process of manufacturing a product comprising alpha calcium sulfate hemihydrate and beta calcium sulfate hemihydrate comprising the steps of:

feeding a 50-75 wt. % gypsum slurry to a first reactor, the slurry comprising calcium sulfate dihydrate and water;

calcining the slurry in the reactor at conditions sufficient to form a partially calcined slurry comprising water, calcium sulfate dihydrate and alpha calcium sulfate hemihydrate, wherein the slurry is held in the first reactor at conditions for calcining the gypsum to convert 50 to 90% of the gypsum to alpha calcium sulfate hemihydrate, wherein at least one crystal modifier is added to the calcium sulfate dihydrate and water before said calcining in the first reactor, wherein the first reactor is operating at a pressure of 15 to 100 psig during the calcining in the first reactor, wherein the residence time of the slurry in the first reactor ranges from 2 to 30 minutes during the calcining in the first reactor;

dewatering the partially calcined slurry to form a water stream and dewatered solids comprising the calcium sulfate dihydrate and alpha calcium sulfate hemihydrate;

feeding the dewatered solids to a second reactor; and calcining the dewatered solids in the second reactor to convert at least a portion of the calcium sulfate dihydrate of the dewatered solids into beta calcium sulfate hemihydrate, wherein the calcining of the dewatered solids occurs in the second reactor operated at atmospheric pressure and a temperature of from 150 to 1000° F.

2. The process of claim 1, wherein the crystal modifier is at least one member selected from the group consisting of maleic acid, succinic acid, lactic acid, citric acid, tartaric acid, monosodium gluconate, ethylene diamine tetra-acetic acid or sodium salt thereof, aspartic acid, polyacrylic acid, tri-polyphosphate, penta-sodium salt of amino trimethylene phosphonic acid, ethylene diamine tetra-acetic acid or sodium salt thereof, and diethylene triamine penta-acetic acid.

3. The process of claim 1, wherein the slurry is held in the first reactor at conditions for calcining the gypsum to convert 70 to 85% of the gypsum to alpha calcium sulfate hemihydrate.

4. The process of claim 1, wherein the at least one crystal modifier is added to the calcium sulfate dihydrate and water before said calcining in the first reactor to control crystal morphology of the calciun sulfate hemihydrate to achieve a d50 average particle size of 50 to 20 microns.

5. The process of claim 1, wherein the first reactor is a continuous stirred tank reactor.

6. The process of claim 1, wherein the slurry is held in the first reactor at conditions for calcining the gypsum to convert 80 to 90% of the gypsum to alpha calcium sulfate hemihydrate.

7. The process of claim 1, wherein the first reactor is operating at a pressure of 25 to 75 psig during the calcining in the first reactor.

8. The process of claim 1, wherein the first reactor is operating at a pressure of 35 to 55 psig during the calcining in the first reactor.

9. The process of claim 1, wherein the residence time of the slurry in the first reactor ranges from 5 to 15 minutes during the calcining in the first reactor.

10. The process of claim 1, wherein the second reactor comprises a kettle.

11. The process of claim 10, wherein the calcining of the dewatered solids occurs in the kettle containing a fluidized bed comprising the dewatered solids.

12. The process of claim 11, wherein the calcining of the dewatered solids occurs in the kettle operated at atmospheric pressure, and a temperature of from 250 to 650° F.

13. The process of claim 11, wherein the calcining of the dewatered solids occurs in the kettle operated at atmospheric pressure, and a temperature of from 400 to 500° F.

14. The process of claim 11, wherein the calcining of the dewatered solids occurs in the kettle operated at atmospheric pressure, and a temperature of from or 285 to 300° F.

15. The process of claim 11, wherein the dewatered solids fed to the kettle comprise 2 to 6 wt. % free water.

16. The process of claim 1, wherein the dewatered solids have a temperature between 150 and 300° F. upon dewatering and when fed to the second reactor.

17. The process of claim 1, further comprising mixing water and gypsum to form the 50-75 wt. % gypsum slurry, wherein the water stream from dewatering is recycled to the mixing step.

18. The process of claim 17, wherein the water stream from dewatering is recycled at elevated temperature to the mixing step to recover heat, water and chemicals used in the process.

* * * * *